(12) United States Patent
Kusama

(10) Patent No.: US 7,931,271 B2
(45) Date of Patent: Apr. 26, 2011

(54) DOCUMENT FEEDING DEVICE WITH OPPOSITELY ARRANGED DOCUMENT PLACING AND EJECTION TRAYS

(75) Inventor: Takuro Kusama, Kitanagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 12/406,242

(22) Filed: Mar. 18, 2009

(65) Prior Publication Data

US 2009/0324312 A1  Dec. 31, 2009

(30) Foreign Application Priority Data

Jun. 25, 2008 (JP) ................................ 2008-165911

(51) Int. Cl.
  *B65H 29/00* (2006.01)
(52) U.S. Cl. ....................................... 271/186; 399/374
(58) Field of Classification Search .................. 271/185, 271/186, 163; 399/374
  See application file for complete search history.

(56) References Cited

U.S. PATENT DOCUMENTS

| 4,777,511 A * | 10/1988 | Takahashi ..................... 399/374 |
| 4,934,681 A * | 6/1990 | Holmes et al. ................ 271/3.18 |
| 5,430,536 A | 7/1995 | Fullerton et al. |
| 5,653,437 A * | 8/1997 | Inoue et al. ................... 271/178 |
| 5,791,645 A | 8/1998 | Takada |
| 2007/0210512 A1* | 9/2007 | Sakakibara et al. .......... 271/314 |
| 2010/0301544 A1* | 12/2010 | Shingai ......................... 271/163 |

FOREIGN PATENT DOCUMENTS

| JP | 07-175279 | 7/1995 |
| JP | 08-282897 | 10/1996 |
| JP | 08282897 A * | 10/1996 |
| JP | 08-310740 | 11/1996 |
| JP | 2001-106408 | 4/2001 |
| JP | 2002-362813 A | 12/2002 |
| JP | 2005-162458 A | 6/2005 |
| JP | 2006-232460 | 9/2006 |

OTHER PUBLICATIONS

JP Office Action dtd Jun. 29, 2010, JP Appln. 2008-165911, partial English translation.
CN Office Acton dtd Nov. 9, 2010, CN Appln. 200910130547.2, English translation.

* cited by examiner

*Primary Examiner* — Stefanos Karmis
*Assistant Examiner* — Gerald W McClain
(74) *Attorney, Agent, or Firm* — Banner & Witcoff, Ltd.

(57) ABSTRACT

A document feeding device includes: a document placing tray; a document ejection tray disposed above the document placing tray; a feeding path; a separating mechanism; and ejection rollers. A nip position of the ejection rollers is arranged in a side opposite to a side where the document placing tray is arranged with reference to a vertical plane passing through a separation position of the separating mechanism.

7 Claims, 12 Drawing Sheets

DOCUMENT FEEDING DEVICE WITH OPPOSITELY ARRANGED DOCUMENT PLACING AND EJECTION TRAYS

CROSS REFERENCE TO RELATED APPLICATION

The present disclosure relates to the subject matter contained in Japanese patent application No. 2008-165911 filed on Jun. 25, 2008, which is expressly incorporated herein by reference in its entirety.

TECHNICAL FIELD

The present invention relates to a document feeding device which feeds a document from a document placing tray through a reading position to a document ejection tray.

BACKGROUND ART

JP-A-8-310740 (see FIG. 4, U.S. Pat. No. 5,791,645) discloses a document feeding device which feeds a document from a document placing tray through a reading position to a document ejection tray (stacking portion) arranged above the document placing tray (document placing portion). In this type of the document feeding device, a document is supplied from a lower side below the document ejection tray, and is ejected to an upper side (onto the document ejection tray) after its image is read.

Because the document ejection tray is disposed to cover an upper side above the document placing tray, it is not easy to place a document on the document placing tray.

SUMMARY

The invention was made in view of the above-noted and/or other circumstances.

According to one of aspects of the invention, a document feeding device is provided, which includes a document placing tray, a document ejection tray disposed above the document placing tray, a feeding path, a separating mechanism, and ejection rollers. A first nip position where the ejection rollers nip a document is arranged in a side opposite to a side where the document placing tray is arranged, with reference to a vertical plane passing through a separation position of the separating mechanism.

Here, the "separation position" means a position where a document is separated from documents in the separating mechanism to be fed toward a reading position. As specific examples of the separation position, a nip position between a separating roller and a separating pad, a nip position between separating rollers, etc. can be mentioned.

Generally, the dimension of each tray in the feeding direction of a document is set to be approximately equal to the length of a document from a position where the separating mechanism or the ejection rollers is arranged, in order to stably support one end of a placed or ejected document so as not to hang down greatly.

According to the document feeding device, the first nip position where the ejection roller nips a document is arranged in a side opposite to a side where the document placing tray is arranged with reference to a vertical plane passing through the separation position of a separating mechanism. It is thus possible to arrange the document ejection tray to shift to the same side as the first nip position. Accordingly, since a portion which is not covered with document ejection tray is formed above the document placing tray, a document can be easily placed from this portion.

Accordingly, as one of advantages, this invention can provide a document feeding device in which a document can be placed easily. As another one of advantages, this invention can provide a document feeding device having and the improved operability. These and other advantages of this invention will be discussed in detail with reference to the accompanying drawings.

DESCRIPTION OF THE PREFERRED EMBODIMENT

Figure 2:
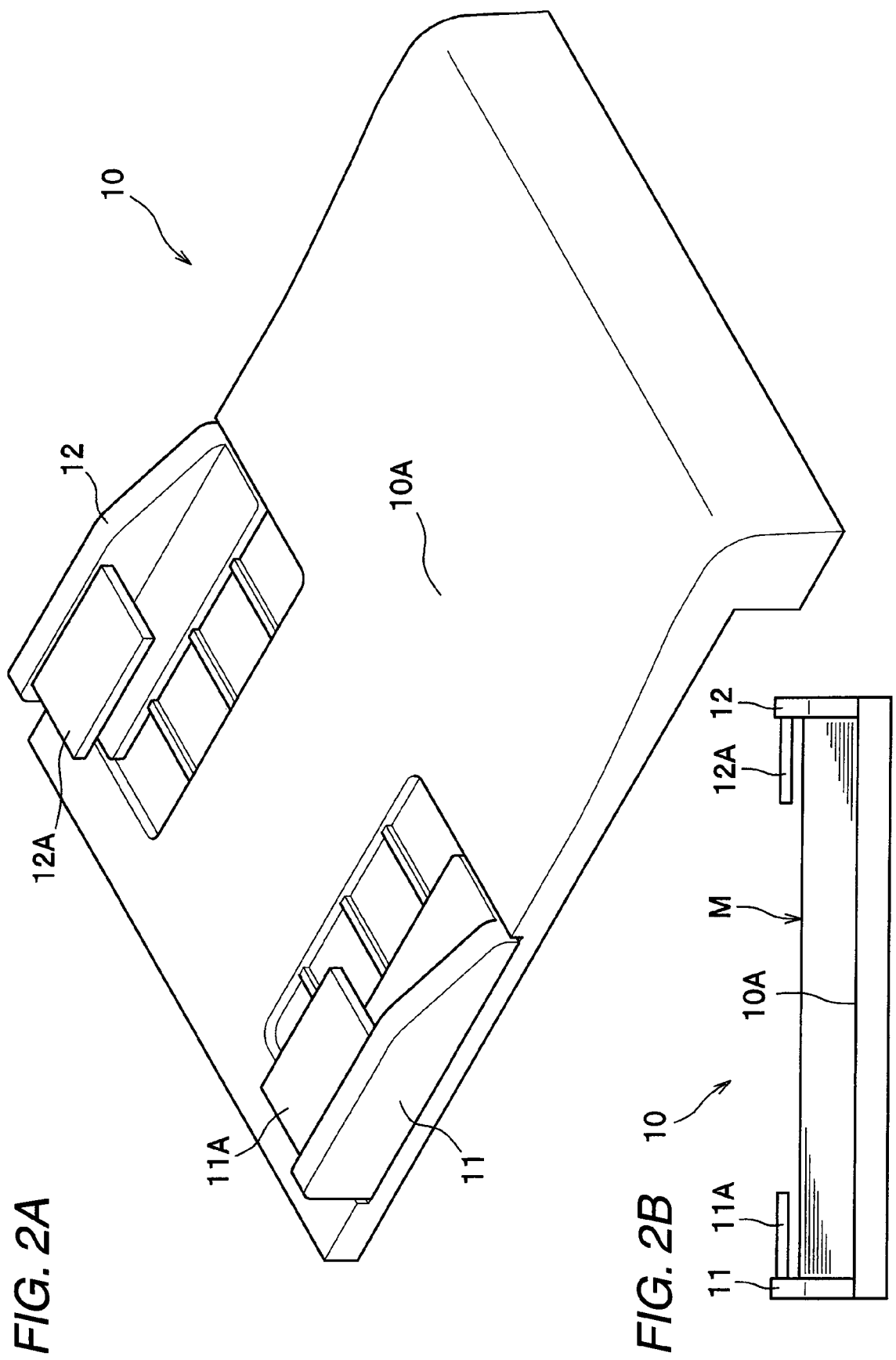
FIGS. 2A and 2B are a perspective view (FIG. 2A) and a front view (FIG. 2B) of a document placing tray.
Figure 3:
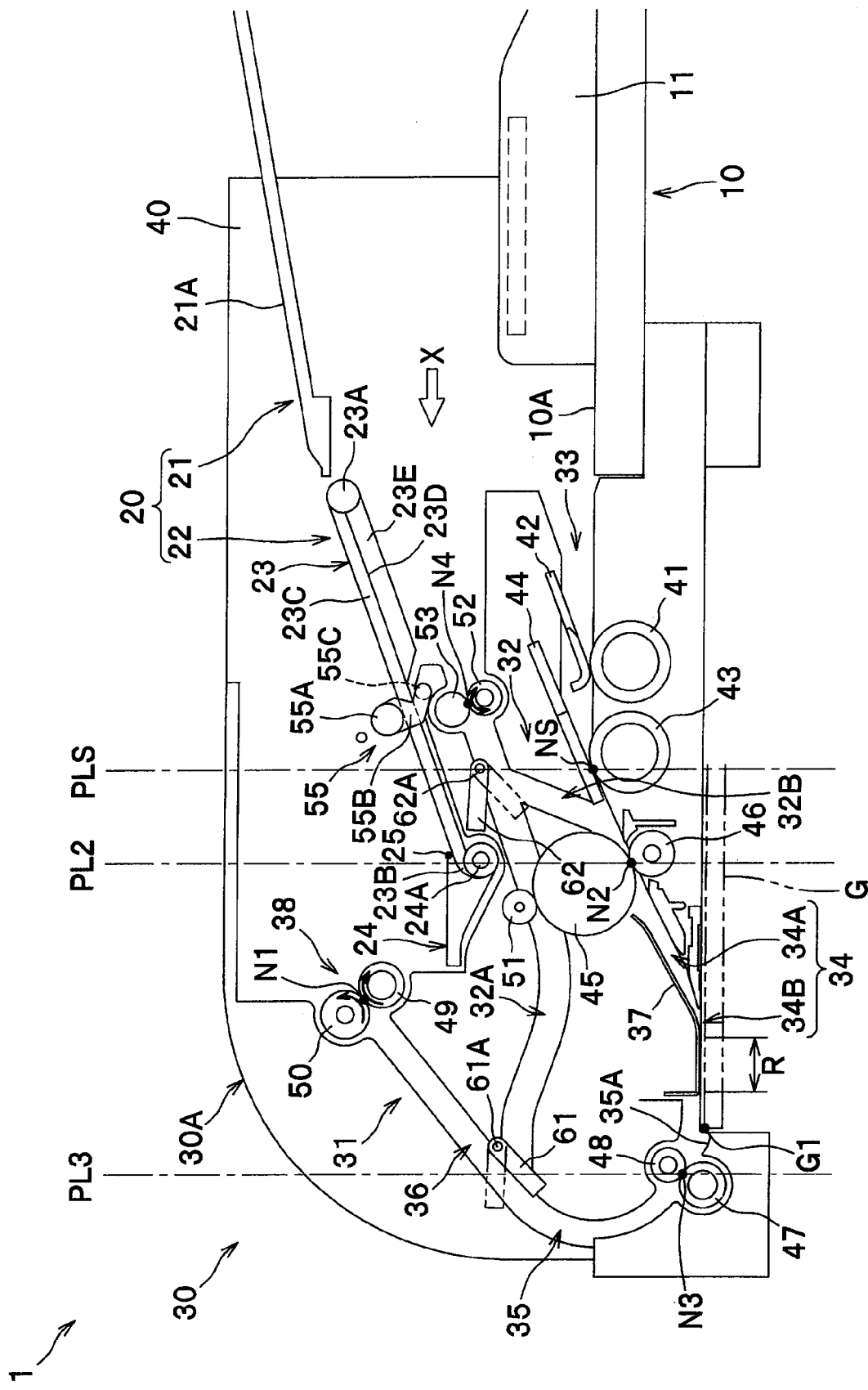
FIG. 3 is an enlarged view of the document feeding unit.
Figure 4:
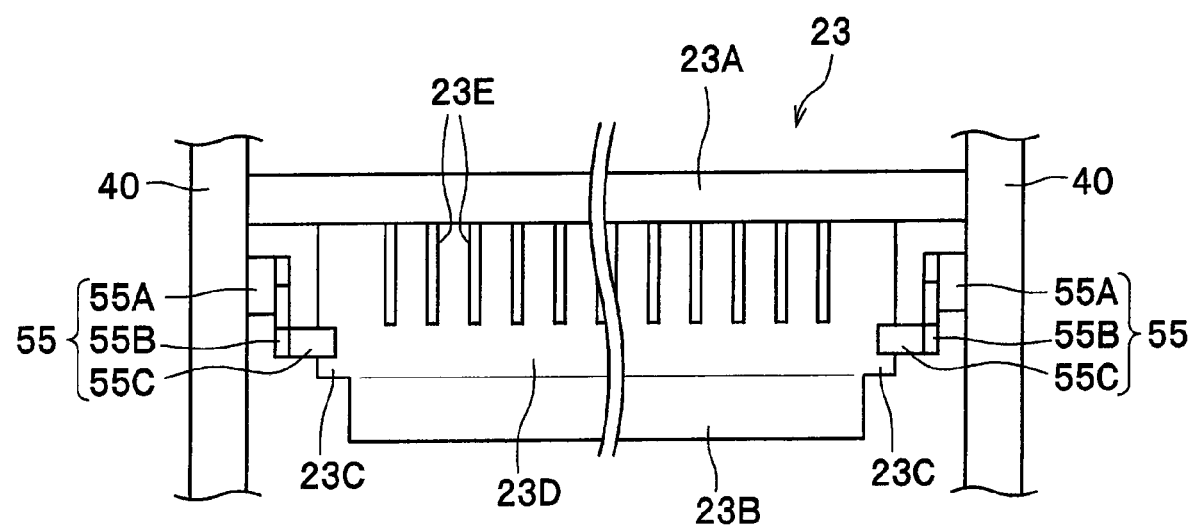
FIG. 4 is a drawing when a flap portion and cams are observed in the direction of an arrow X of FIG. 3.

Next, preferred embodiments of the invention will be described in detail appropriately referring to the accompanying drawings. In the drawings to be referred to, FIG. 1 is a view showing the entire configuration of a document feeding device, FIGS. 2A and 2B are a perspective view (FIG. 2A) and a front view (FIG. 2B) of a document placing tray, FIG. 3 is an enlarged view of a document feeding unit, and FIG. 4 is a view when a flap portion and a cam is observed in the direction of an arrow X of FIG. 3.

Here, in the following description, a "feeding direction" is defined as a direction (a direction indicated by the arrow of FIG. 1) in which a document is fed toward a document ejection tray 20 along a feeding path 31 (and a second reversal path 32B, FIG. 7), and an "ejection direction" is defined as a direction (a direction from the left toward the right of FIG. 1) in which a document is ejected. Additionally, the upstream and downstream in the feeding direction and a feeding-out direction may be simply referred to as "upstream" and "downstream", respectively. Moreover, a width direction (a direction of a reader side or a side away from the reader with respect to the sheet plane of FIG. 1) orthogonal to the feeding direction and ejection direction of a document is simply referred to as "width direction."

Figure 1:
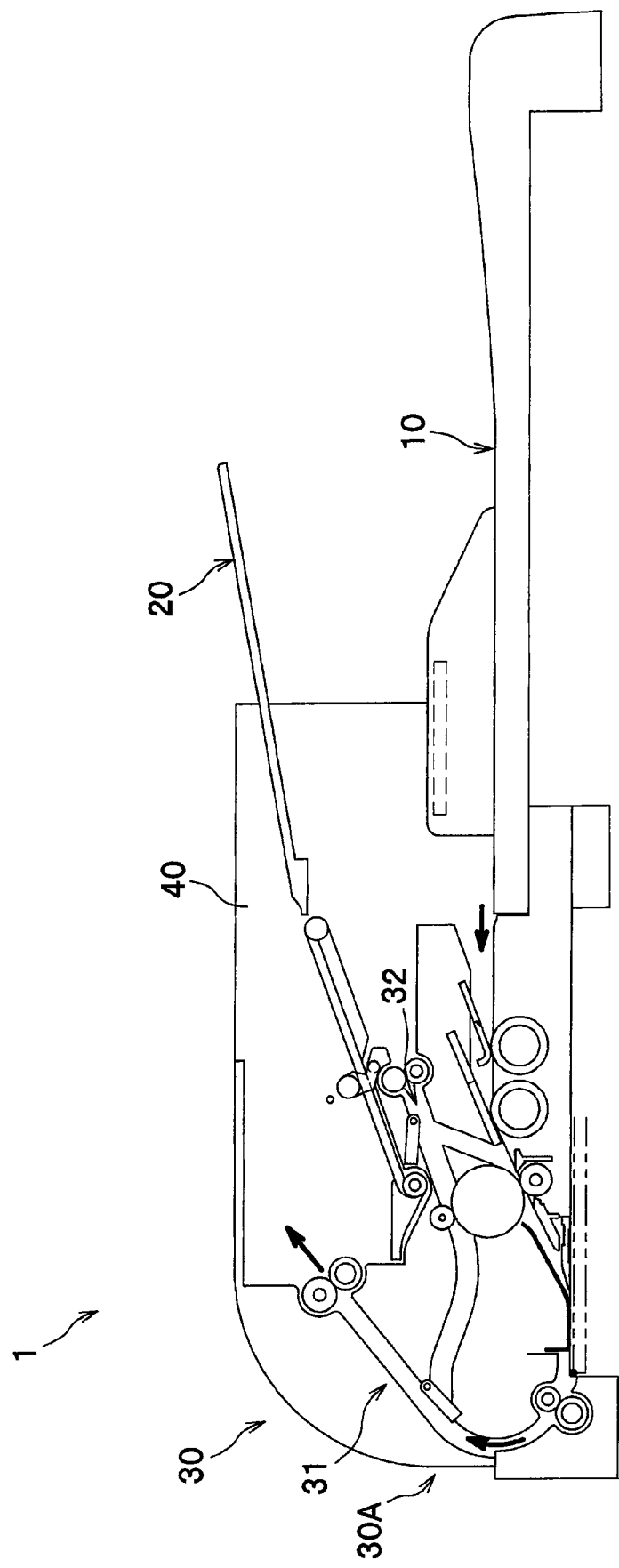
FIG. 1 is a drawing showing the entire configuration of a document feeding device according to an embodiment of invention.

As shown in FIG. 1, the document feeding device 1 mainly includes a document placing tray 10, a document ejection tray 20, and a document feeding unit 30.

<Configuration of Document Placing Tray>

The document placing tray 10 is a portion on which a document to be read (to be fed) is placed, and is provided at a right lower portion of the document feeding device 1 as shown in FIG. 1. As shown in FIGS. 2A and 2B, the document placing tray 10 has a pair of document guides 11 and 12 which erect from a placing surface 10A and which faces each other in the width direction.

The document guides 11 and 12 restrict the position, in the width direction, of a document M placed on the placing surface 10A. When the document guide 11 (or 12) is slidingly moved in the width direction, the document guide 12 (or 11) interlocked therewith by an interlocking mechanism is also slidingly moved in the width direction oppositely to the document guide 11 (or 12).

Upper ends of the document guides 11 and 12 are provided with flat-plate-shaped document supporting portions 11A and 12A which extend inward in the width direction. The document supporting portions 11A and 12A place and support thereon a document, which is temporarily ejected to a lower side below the document ejection tray 20 by a reversing mechanism (a switchback roller 52 and a pinch roller 53) which will be described later.

<Configuration of Document Ejection Tray>

As shown in FIG. 1, the document ejection tray 20 is a portion onto which a document (from which an image has been already read) is ejected and placed. The document ejection tray 20 is disposed above the document placing tray 10. As shown in FIG. 3, the document ejection tray 20 includes a tray portion 21 and a flap portion 22 disposed upstream of the tray portion 21.

The tray portion 21 is arranged above the document placing tray 10. An upstream portion of the tray portion 21 is fixed to side panels 40 at both sides in the width direction. An upper surface of the tray portion 21 serves as a stacking surface 21A to which a document is ejected. In addition, the side panels 40 are panel-shaped members which are arranged at both sides in the width direction and which constitute, in combination with a main frame 30A, an outer frame (housing) of the document feeding device 1.

The flap portion 22 includes a first flap 23, and a second flap 24.

The first flap 23 is rockable up and down with respect to the tray portion 21 about a rocking shaft 23A provided at a downstream end thereof, and an upstream end of the first flap 23 is formed with a bearing portion 23B. As shown in FIG. 4, both ends of the first flap 23 in the width direction serve as abutting portions 23C on which cams 55 (push-up portions 55C) abut. Additionally, a downstream portion of the first flap 23 (an upper portion of the first flap 23 in FIG. 4) has a plurality of ribs 23E which extend in the ejection direction and which protrude from a lower surface 23D facing a side where the document placing tray 10 is provided.

As shown in FIG. 3, the second flap 24 is arranged upstream of the first flap 23, and is rockable with respect to the first flap 23 about a rocking shaft 24A which is received in the bearing portion 23B of the first flap 23. The second flap 24 is maintained in a state where it is bent with respect to the first flap 23 such that its upper surface becomes substantially horizontal, when the flap portion 22 is located at a rock-down position shown in FIG. 3. In linking with the upward rocking of the flap portion 22 (first flap 23), an upstream end 24B of the second flap 24 rocks downward about the rocking shaft 24A (see FIG. 10). The second flap 24 has a curved portion 25 which is bent obliquely downward from a downstream end of an upper surface of the second flap 24.

Here, the configuration of the cams 55 for rocking the flap portion 22 up and down will be described.

As shown in FIG. 4, the cams 55 are arranged at both sides of the first flap 23 in the width direction, and each cam is integrally comprised of a shaft portion 55A, a connecting portion 55B, and a push-up portion 55C. The shaft portion 55A is provided in the side panel 40 so as to be rotatable forwardly and reversely, and is rotationally driven by a driving force transmitted thereto from a motor (not shown). The connecting portion 55B connects the shaft portion 55A to the push-up portion 55C, and is arranged substantially parallel to the side panel 40. The push-up portion 55C is a substantially cylindrical portion which extends inward in the width direction from one end of the connecting portion 55B.

<Configuration of Document Feeding Unit>

As shown in FIG. 1, the document feeding unit 30 is configured to feed a document from the document placing tray 10 to the document ejection tray 20, and is disposed at the left side of the document placing tray 10 and the document ejection tray 20. The document feeding unit 30 has the outer frame mainly comprised of the main frame 30A.

The feeding path 31 and the reversal path 32 are formed mainly by the main frame 30A in the document feeding unit 30. The feeding path 31 is provided with a feeding mechanism for feeding a document, and the reversal path 32 is provided with a reversing mechanism for switching back a document. Hereinafter, detailed configurations of them will be described.

[Configuration of Feeding Path and Feeding Mechanism]

As shown in FIG. 3, the feeding path 31 is a path along which a document is guided to the document ejection tray 20 via a reading position R from the document placing tray 10, and is formed in a substantial U-shape. The feeding path 31 is comprised of an inlet path 33, a lower feeding path 34, a curved path 35, and an upper feeding path 36.

The inlet path 33 extends substantially horizontally toward the downstream from the placing surface 10A of the document placing tray 10, and upper and lower guide surfaces of the inlet path 33 are formed by the main frame 30A.

The lower feeding path 34 is mainly comprised of an inclined portion 34A which extends obliquely downward from a downstream end of the inlet path 33, and a horizontal portion 34B which extends substantially horizontally toward the downstream from a downstream end of the inclined portion 34A. In the lower feeding path 34, a lower guide surface of the inclined portion 34A is formed by the main frame 30A, and upper guide surfaces of the inclined portion 34A and the horizontal portion 34B are formed by a document guide member 37. A lower side of the horizontal portion 34B is exposed so that this portion serves as the reading position R.

The document guide member 37 has mainly an inclined portion and a horizontal portion (reference numerals thereof are omitted) corresponding to the lower feeding path 34, and the horizontal portion holds down a document exposed to the outside of the document feeding unit 30 at the reading position R. A platen glass G of a document reading device is arranged below the horizontal portion of the document guide member 37. When a document is fed through the horizontal portion 34B while being held between the document guide member 37 and the platen glass G, an image on the document is read by an image sensor (not shown) of the document reading device at the reading position R.

The curved path 35 extends in an arcuate shape upward from a downstream end of the lower feeding path 34 (horizontal portion 34B) to curve the feeding direction from the left to the right of FIG. 3. Guide surfaces of the curved path 35 are formed by the main frame 30A. A guide surface 35A is formed at a lower surface of an upstream end of the curved path 35. The guide surface 35A inclines from a position, lower than an upper end G1 of a downstream end of the platen glass G, toward a nip position between a second feeding roller 47 and a pinch roller 48. Accordingly, a document which has been fed on the platen glass G is fed to the curved path 35 without being caught.

The upper feeding path 36 extends obliquely upward toward the document ejection tray 20 from a downstream end of the curved path 35. In the upper feeding path 36, an upper guide surface is formed by the main frame 30A, and a lower guide surface is formed by the main frame 30A and an upper surface of a first guide member 61. The downstream end of the upper feeding path 36 serves as a document ejection port 38.

A feeding mechanism is mainly comprised of a feed-in roller 41 and a feed-in pad 42, a separating roller 43 and a separating pad 44 (an example of a separating mechanism), a first feeding roller 45 and a pinch roller 46 (an example of a pair of upstream feeding rollers), a second feeding roller 47 and a pinch roller 48 (an example of a pair of downstream feeding rollers), and a sheet ejection roller 49 and a pinch roller 50 (an example of a pair of sheet ejection rollers).

The feed-in roller 41 and the feed-in pad 42 are configured to move a document or documents toward the separating roller 43. That is, a document or documents which are placed on the document placing tray 10 and whose tips have not reached the separating roller 43 are moved and thus fed to the separating roller 43 by the feed-in roller 41 and the feed-in pad 42. The feed-in roller 41 and the feed-in pad 42 are arranged substantially in the middle of the inlet path 33.

The feed-in roller 41 is arranged such that its upper portion is exposed substantially at the middle, lower side of the inlet path 33, and is rotationally driven by a driving force transmitted thereto from a motor (not shown).

The feed-in pad 42 pushes a document against the feed-in roller 41 to feed the document reliably, and is located above the feed-in roller 41 to face the feed-in roller 41. The feed-in pad 42 is rockable up and down, and is biased toward the feed-in roller 41.

The separating roller 43 and the separating pad 44 are configured to separate a document one by one at a separation nip position NS (separation position) where they nip the document therebetween, and feed the document toward the reading position R. The separating roller 43 and the separating pad 44 are arranged at a downstream end of the inlet path 33.

The separation roller 43 is arranged such that its upper portion is exposed at the lower side of a downstream end of the inlet path 33, and is rotationally driven by a driving force transmitted thereto from a motor (not shown).

The separation pad 44 pushes a document against the separation roller 43 to reliably separate and feed the document one by one, and is arranged above the separation roller 43 to face the separation roller 43. The separation pad 44 is rockable up and down, and is biased toward the separation roller 43.

The first feeding roller 45 and the pinch roller 46 are configured to feed a document toward the reading position R, at a second nip position N2 where they nips the document therebetween, and are arranged between the separation nip position NS of the feeding path 31, and the reading position R, more specifically, substantially in the middle of the inclined portion 34A. The first feeding roller 45 and the pinch roller 46 are arranged just before the reading position R (first document feeding rollers from the reading position R toward the upstream).

The first feeding roller 45 is arranged such that its lower portion is exposed to the lower feeding path 34 substantially at the middle, upper side of the inclined portion 34A, and is rotationally driven by a driving force transmitted thereto from a motor (not shown).

The pinch roller 46 is arranged such that its upper portion abuts against the first feeding roller 45 at the middle, lower side of the inclined portion 34A.

The second feeding roller 47 and the pinch roller 48 are configured to feed a document mainly to the document ejection tray 20 from the reading position R, at a third nip position N3 where they nip the document therebetween, and are arranged between the reading position R of the feeding path 31, and a nip position N1 between the sheet ejection roller 49 and the pinch roller 50, more specifically, at an upstream end of the curved path 35. The second feeding roller 47 and the pinch roller 48 are arranged just behind the reading position R (first document feeding rollers from reading position R toward the downstream).

The second feeding roller 47 is arranged such that its upper portion is exposed to the lower side of an upstream end of the curved path 35, and is rotationally driven by a driving force transmitted thereto from a motor (not shown).

The pinch roller 48 is arranged such that its lower portion abuts against the second feeding roller 47 at the upper side of the upstream end of the curved path 35.

The sheet ejection roller 49 and the pinch roller 50 are configured to eject a document (document from which an image has been read) from the document feeding unit 30 to the document ejection tray 20, at the first nip position N1 where they nip the document therebetween. The sheet ejection roller 49 and the pinch roller 50 are arranged at a downstream end (document ejection port 38) of the upper feeding path 36.

In more detail, the first nip position N1 is arranged in a side opposite to a side where the document placing tray 10 is arranged, with reference to a vertical plane PLS passing through the separation nip position NS (the left side of FIG. 3). In other words, the first nip position N1 is arranged in the side (the left side of FIG. 3) opposite to the side where the document placing tray 10 is arranged with reference to a vertical plane PL2 passing through the second nip position N2.

Additionally, the first nip position N1 is arranged in the side (the right side of FIG. 3) where the document placing tray 10 is arranged with reference to a vertical plane PL3 passing through the third nip position N3.

That is, the first nip position N1 is arranged between the two vertical planes PL2 and PL3 such that an imaginary triangle formed by the first nip position N1, the second nip position N2 and the third nip position N3 has angles, each being acute (less than 90 degrees).

The sheet ejection roller 49 is rotationally driven clockwise in FIG. 3 by a driving force transmitted thereto from a motor (not shown).

The pinch roller 50 is arranged above the ejection roller 49 to abut against the sheet ejection roller 49.

In addition, the pinch rollers 46, 48, and 50 are respectively biased toward the rollers 45, 47, and 49 by biasing members (not shown) to push a document against the rollers 45, 47, and 49. Accordingly, a document can be fed reliably.

[Configuration of Reversal Path and Reversing Mechanism]

The reversal path 32 is comprised of a first reversal path 32A along which a portion of a document is guided to the outside for switchback, and a second reversal path 32B along which the document is guided again to the reading position R after the switchback.

The first reversal path 32A branches from the feeding path 31 at a position (downstream end of the curved path 35) downstream of the reading position R, and extends toward the outside (right of FIG. 3). An upper guide surface of the first reversal path 32A is formed by the main frame 30A, a lower surface of the first guide member 61 (see a chain line of FIG. 3), and a lower surface of the second guide member 62 (see a solid line of FIG. 3). A lower guide surface of the first reversal path 32A is formed by the main frame 30A.

The first feeding roller 45 whose upper portion is exposed from the lower guide surface and the pinch roller 51 which is located above the first feeding roller 45 to abut against the first feeding roller 45 are arranged substantially in the vicinity of the middle of the first reversal path 32A.

The first feeding roller 45 feeds a document toward the outside (right of FIG. 3) when the document is within the first reversal path 32A.

The pinch roller 51 is biased toward the first feeding roller 45 to push a document against the first feeding roller 45. Accordingly, a document can be fed reliably.

The second reversal path 32B extends obliquely downward from the first reversal path 32A, and is connected to the upstream side of the reading position R, specifically, an upstream end of the lower feeding path 34 (inclined portion 34A). An upper guide surface of the second reversal path 32B is formed by the main frame 30A and a lower surface of the second guide member 62 (see a chain line of FIG. 3), and a lower guide surface of the second reversal path 32B is formed by the main frame 30A.

The first guide member 61 and the second guide member 62 are configured to switch a path along which a document is fed. The first guide member 61 is arranged in the vicinity of a branch portion between the feeding path 31 and the first reversal path 32A, and a second guide member 62 is arranged in the vicinity of a branch portion between the first reversal path 32A and the second reversal path 32B.

The first guide member 61 is rockable up and down about the rocking shaft 61A. When the first guide member has rocked downward (see the solid line of FIG. 3), the first guide member forms a portion of the lower guide surface of the upper feeding path 36, and guides a document to the outside from the feeding path 31 (upper feeding path 36). When the first guide member has rocked upward (see the chain line of FIG. 3), the first guide member forms a portion of the upper guide surface of the first reversal path 32A, and guides a document to the first reversal path 32A.

The second guide member 62 is rockable up and down about the rocking shaft 62A. When the second guide member has rocked upward (see the solid line of FIG. 3), the second guide member 62 forms a portion of the upper guide surface of the first reversal path 32A, and guides a document to the outside from the first reversal path 32A. When the second guide member 62 has rocked downward (see the chain line of FIG. 3), the second guide member 62 forms a portion of the upper guide surface of the second reversal path 32B, and guides a switched-back document to the second reversal path 32B via a downstream end of the first reversal path 32A from outside.

In this embodiment, the reversing mechanism includes the switchback roller 52 and the pinch roller 53 which are arranged at a downstream end of the first reversal path 32A. A fourth nip position N4 where the switchback roller 52 and the pinch roller 53 nip a document therebetween is arranged below the first nip position N1 in an up-and-down (vertical) direction.

The switchback roller 52 is rotatable forwardly and reversely, and its rotational direction is controlled by a control device (not shown) for switchback. In detail, the switchback roller rotates clockwise in FIG. 3 to eject (feeds) a document held between the switchback roller and the pinch roller 53 to the outside. Before a document is ejected completely, the switchback roller 52 is stopped temporarily by the control device, and then is rotated counterclockwise in FIG. 3 to pull in the document held between the switchback roller 52 and the pinch roller 53. At this time, since the second guide member 62 rocks downward (see the chain line of FIG. 3), the pulled-in document is guided to the second reversal path 32B along the lower surface of the second guide member 62.

The pinch roller 53 is arranged above the switchback roller 53 to abut against the switchback roller 52. Since the pinch roller 53 is biased toward the switchback roller 52, a document can be pushed against the switchback roller 52. Accordingly, a document can be fed reliably.

The aforementioned flap portion 22 (the first flap 23) is arranged above a fourth nip position N4 i.e. a temporary document ejection position of the reversing mechanism (switchback roller 52 and the pinch roller 53), when the flap portion is located at the rock-down position shown in FIG. 3.

Here, the arrangement in which the flap portion at the rock-down position is arranged above the ejection position of the reversing mechanism is not limited to a case where all parts of the flap portion at the rock-down position is arranged above the ejection position of the reversing mechanism. That is, a part of the flap portion may be located below the ejection position of the reversing mechanism in a height direction as long as the flap portion at the rock-down position and the ejection position of the reversing mechanism are arranged such that a document can be temporarily ejected to the outside below the flap portion (document ejection tray) during switchback. In other words, it suffices that a part which can be called the flap portion is arranged above the ejection position of the reversing mechanism.

<Operation at Double-Side Reading>

The operation of the document feeding device 1 configured as described above will be described.

Figure 5:
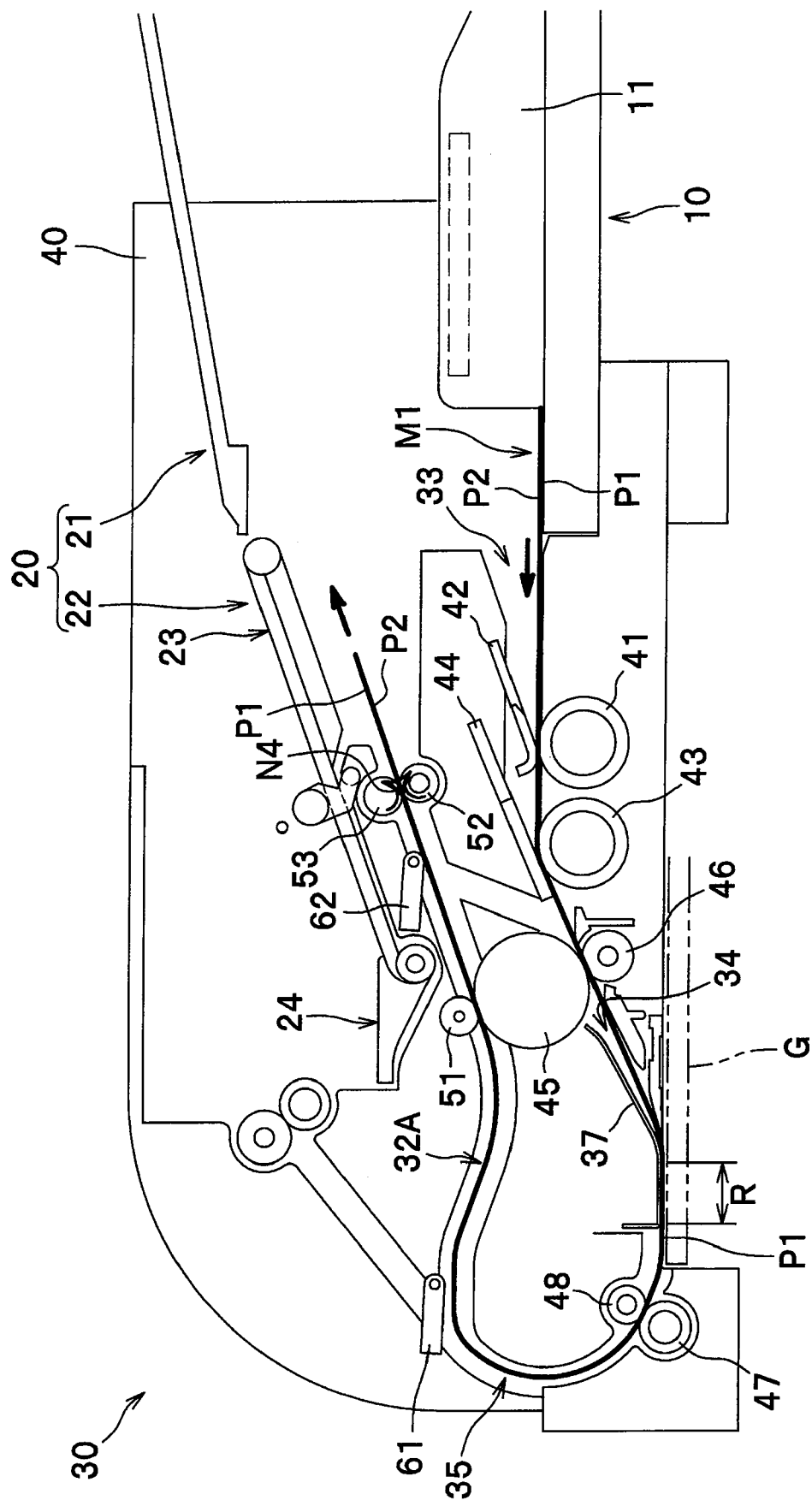
FIG. 5 is a drawing for explaining the operation for double-side reading.
Figure 6:
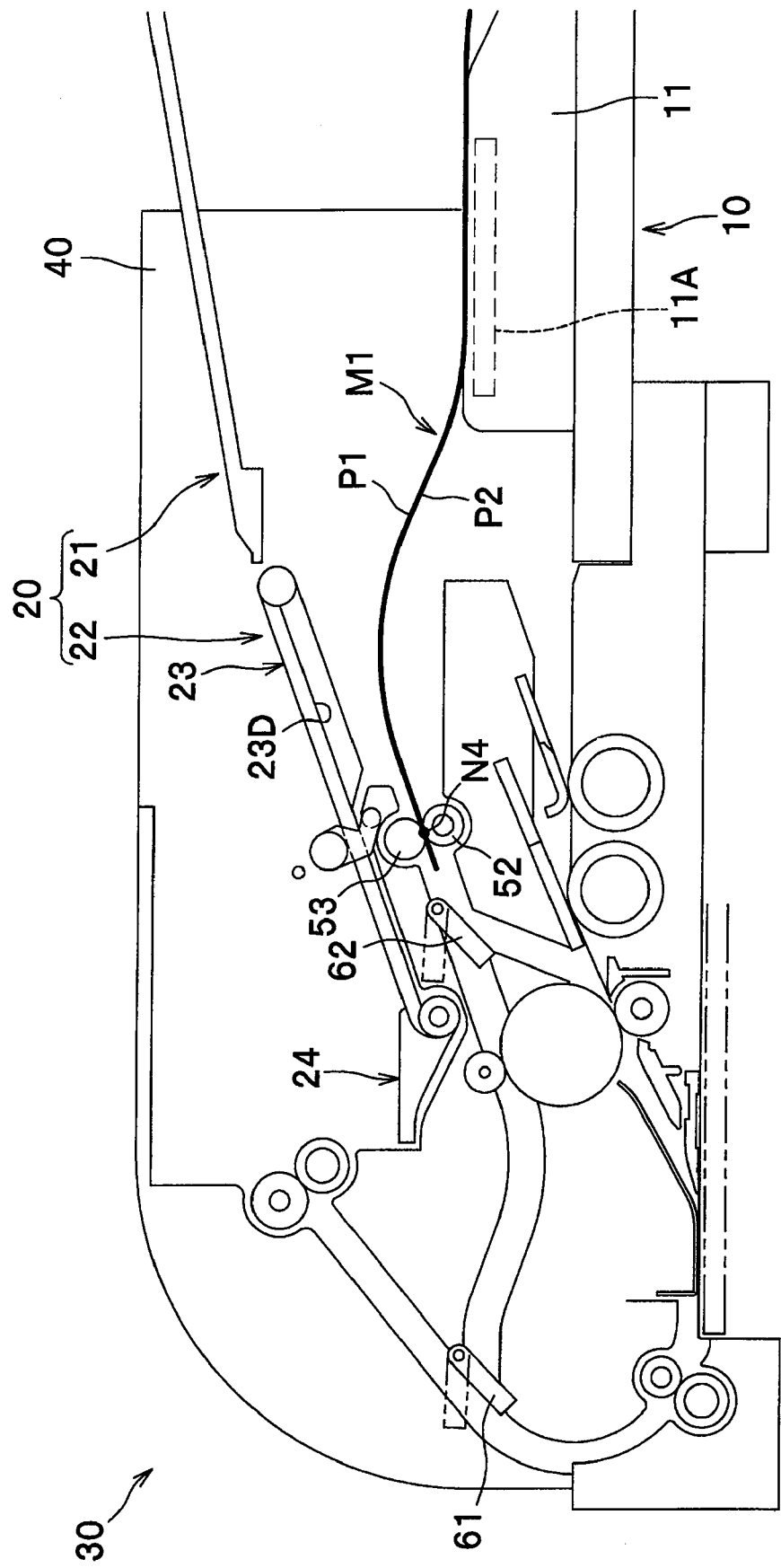
FIG. 6 is a drawing for explaining the operation for double-side reading.
Figure 7:
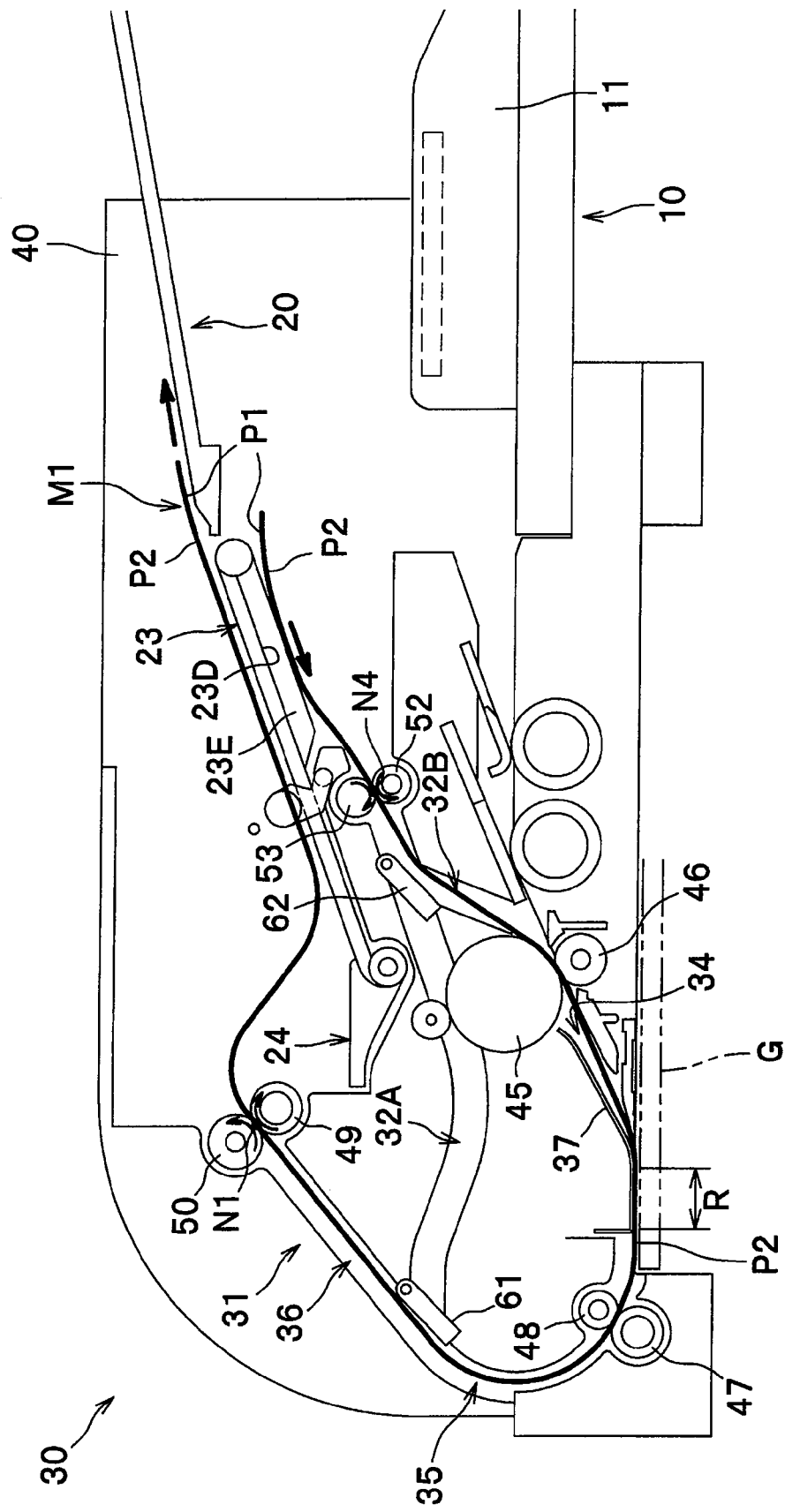
FIG. 7 is a drawing for explaining the operation for double-side reading.
Figure 8:
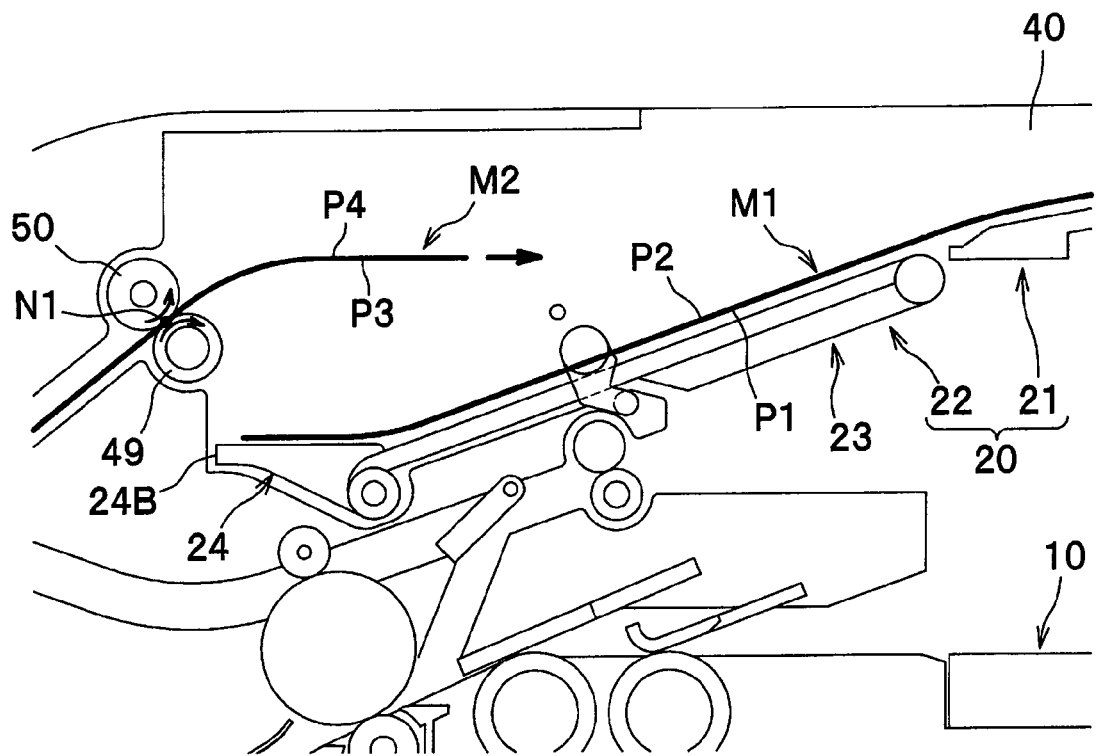
FIG. 8 is a drawing for explaining the operation in a first ejection mode.

First, the operation for double-side reading will be described. FIGS. 5 to 7 are drawings for explaining the operation for double-side reading, and FIG. 8 is a drawing for explaining the operation in a first ejection mode.

For double-side reading, as shown FIG. 5, the flap portion 22 is in a downwardly rocked state (that is, the flap portion 22 is located at the rock-down position). Additionally, before start of reading, each of the guide members 61 and 62 is located at a rock-up position to form part of the upper guide surface of the first reversal path 32A as shown in FIG. 5.

In this state, first, a document M1 is placed on the document placing tray 10 with its front reading surface P1 turned downward and its back reading surface P2 turned upward.

When reading is started, the document M1 is moved to the separating roller 43 by the feed-in roller 41 and the feed-in pad 42, and is further fed to the lower feeding path 34 from the inlet path 33 by the separating roller 43 and the separating pad 44.

The document M1 which has been fed to the lower feeding path 34 is fed to the reading position R with the reading surface P1 turned downward by the first feeding roller 45 and the pinch roller 46, and the reading surface P1 is read at the reading position R. Thereafter, the document M1 is fed along the curved path 35 by the second feeding roller 47 and the pinch roller 48, and is guided to the first reversal path 32A along the lower surface of the first guide member 61. Then, the document M1 is fed to the fourth nip position N4 along the first reversal path 32A by the first feeding roller 45 and the pinch roller 51.

As mentioned above, the flap portion 22 (the first flap 23) in a state where it has rocked downward is arranged above the fourth nip position N4. Accordingly, the document M1 is ejected to the outside below the flap portion 22 (document ejection tray 20) from the nip position N4 between the switchback roller 52 which is rotationally driven clockwise in FIG. 5, and the pinch roller 53 which is rotated to follow the rotation of the switchback roller 52.

At this time, the document M1 is first ejected obliquely upward with its tip along the lower surface 23D of the first flap 23, and after a while, its tip hangs downward due to its own weight to be placed on the document supporting portions 11A and 12A of the document guide 11 and 12 as shown in FIG. 6. Accordingly, the document M1 is supported by the document supporting portions 11A and 12A from below and is ejected well along the document supporting portions 11A and 12A (only the document guide 11 is shown in FIG. 6). Accordingly, when the tip of the document M1 hangs downward due to its own weight, the tip can be kept from falling rapidly and being bent. Thus, bending or damage of the document M1 can be kept from occurring during switchback.

Then, the rotation of the switchback roller 52 is stopped by the control device (not shown) before all of the document M1 is ejected from the nip position N4 between the switchback roller 52 and the pinch roller 53. Accordingly, the document M1 is in a pinched state (a state where the document M1 is partly ejected to the outside) between the switchback roller 52 and the pinch roller 53, with its front reading surface P1 turned upward and its back reading surface P2 turned downward. In this state, the guide members 61 and 62 rock downward to switch a path along which the document M1 is to be fed.

Thereafter, as shown in FIG. 7, as the switchback roller 52 is rotated counterclockwise in FIG. 7, the document M1 is pulled back to the first reversal path 32A by the switchback roller 52 and the pinch roller 53, is fed to second reversal path 32B along the lower surface of the second guide member 62, and is fed to the upstream end (upstream of the reading position R) of the lower feeding path 34.

Since the document M1 is fed (guided) to the second reversal path 32B which extends obliquely downward at a steeper inclination than the first reversal path 32A immediately after the document has been pulled back to the first reversal path 32A, a rear end of the document may jump upward. Similarly, the rear end may jump upward in a case where an end portion of a document is curled upward. In this embodiment, a portion that the rear end of the jumped-up (curled) document M1 hits, i.e., the lower surface 23D of the first flap 23 is provided with the plurality of ribs 23E which extends in the ejection direction. Thus, the document M1 is guided by the plurality of ribs 23E smoothly without sticking to the lower surface 23D. That is, the feeding performance of the document M1 can be improved by providing the plurality of ribs 23E at the lower surface 23D of the first flap 23.

The document M1 which has been fed again to the lower feeding path 34 is fed to the reading position R with the reading surface P2 turned downward by the first feeding roller 45 and the pinch roller 46, and the reading surface P2 is read at the reading position R. Thereafter, the document M1 is fed to the first nip position N1 along the feeding path 31 (the curved path 35 and the upper feeding path 36) by the second feeding roller 47 and the pinch roller 48. Then, the document M1 is ejected to the document ejection tray 20 from the first nip position N1 between the sheet ejection roller 49 and the pinch roller 50, with its front reading surface P1 turned downward and its back reading surface P2 turned upward.

As shown in FIG. 8, the upstream end 24B of the second flap 24 is located below the first nip position N1 in a state where the flap portion 22 has rocked downward. Therefore, the read document M1 is ejected to the document ejection tray 20 such that the read end of the read document M1 is located below the first nip position N1. Accordingly, a next document M2 both sides (reading surfaces P3 and P4) of which has been read is ejected from the first nip position N1 between the sheet ejection roller 49 and the pinch roller 50 to be stacked on the previously ejected document M1.

That is, when the flap portion 22 is located at the rock-down position, the document feeding device 1 can sequentially eject documents in a first ejection mode where a document M1 is ejected onto the document ejection tray 20 and then a subsequent document M2 is ejected to be stacked on the ejected document M1 on the document ejection tray 20. Since the document M1 is ejected with its front reading surface P1 turned downward and its back reading surface P2 turned upward and the document M2 is ejected with its reading surface P3 turned downward and its back reading surface P4 turned upward, the page number of the documents can be aligned in order of P1, P2, P3, and P4 from below. This page order is the same as page order of the documents M1 and M2 placed on the document placing tray 10.

<Switching of Ejection Mode>

Figure 9:
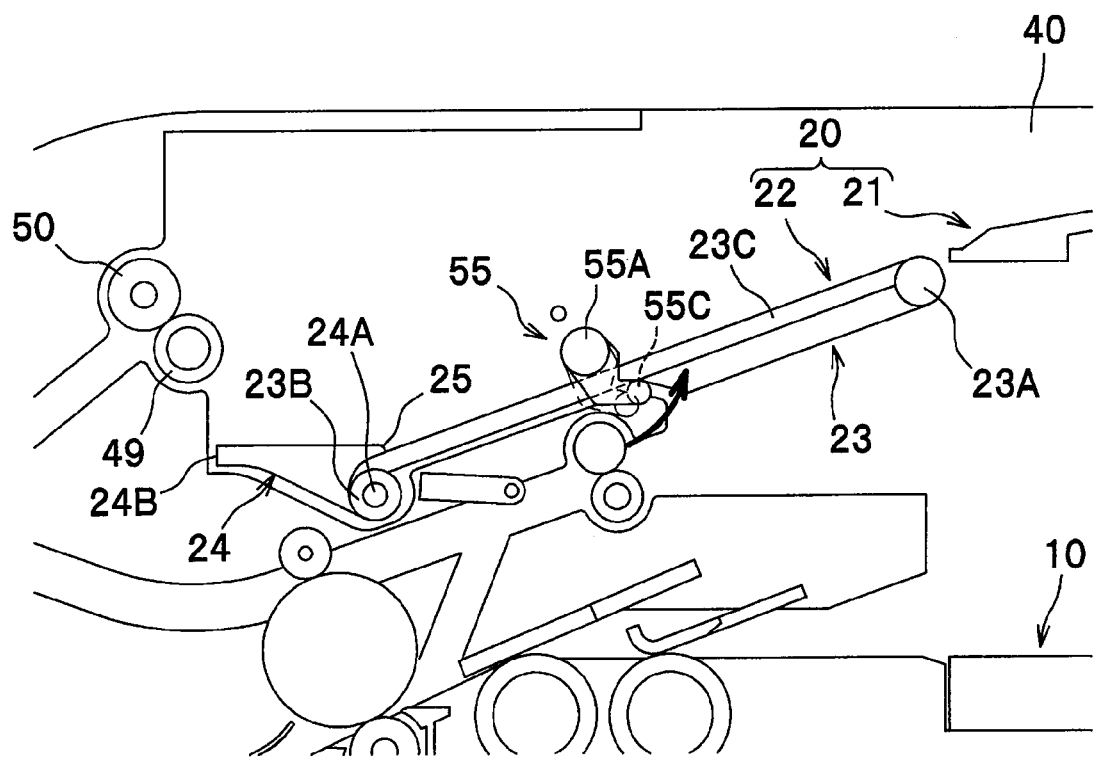
FIG. 9 is a drawing for explaining the operation of the cams and the flap portion.
Figure 10:
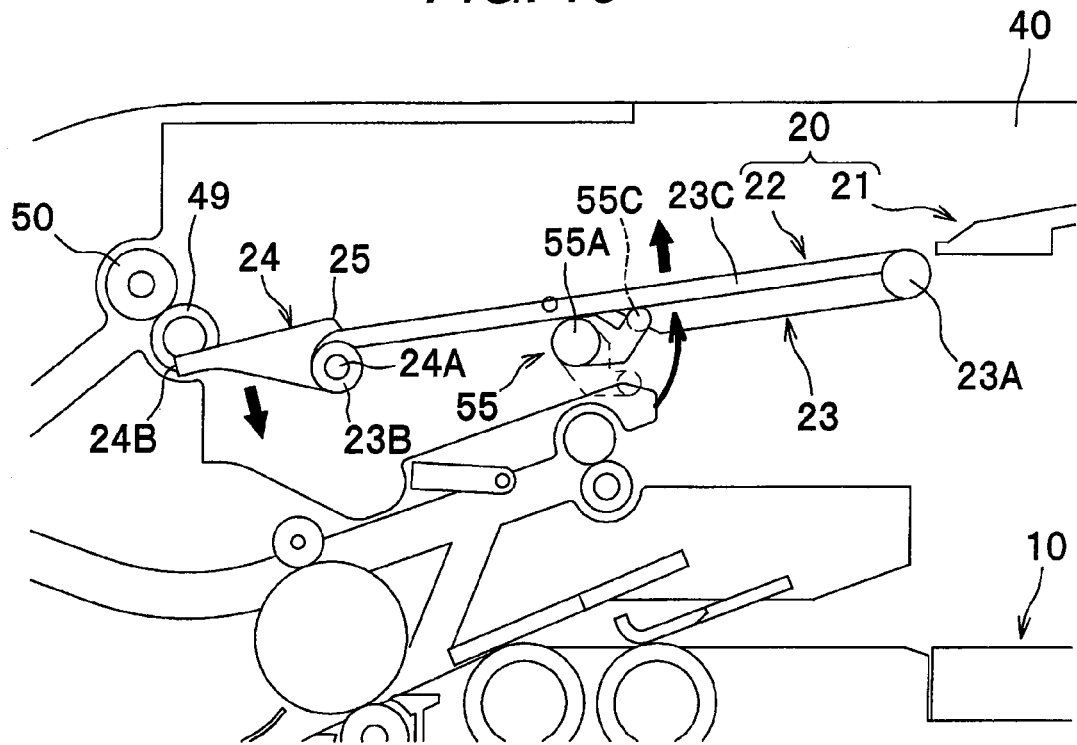
FIG. 10 is a drawing for explaining the operation of the cams and the flap portion.
Figure 11:
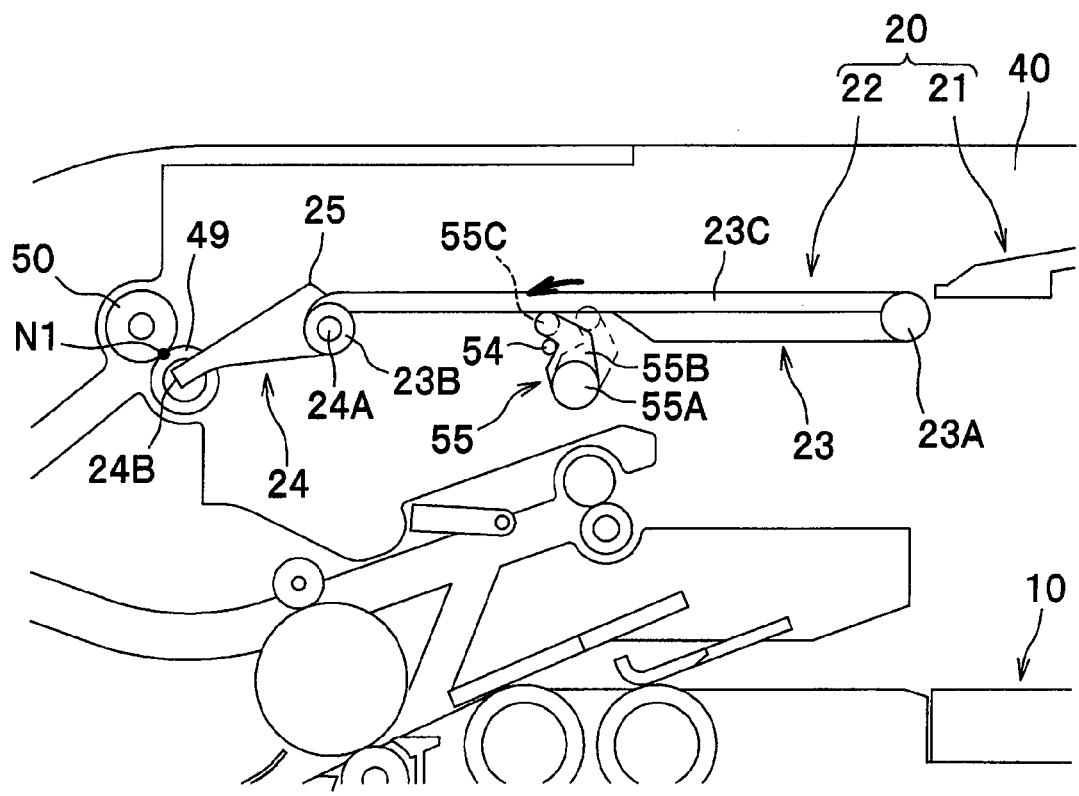
FIG. 11 is a drawing for explaining the operation of the cams and the flap portion.

Next, the operation of the cam 55, and the flap portion 22 (switching of an ejection mode) will be described. FIGS. 9 to 11 are drawings for explaining the operation of the cam and the flap portion.

As shown in FIG. 9, when a driving force is transmitted from a motor (not shown) to rotate the shaft portion 55A of the cam 55 counterclockwise in FIG. 9, the push-up portion 55C is rotated upward about the shaft portion 55A to abut against the lower surface of the abutting portion 23C of the first flap 23.

As shown in FIG. 10, when the push-up portion 55C is further rotated upward, the abutting portion 23C is pushed upward, and the flap portion 22 (first flap 23) rocks upward about the rocking shaft 23A. In linking with the upward rocking of the first flap 23, the upstream end 24B of the second flap 24 rocks downward about the rocking shaft 24A, and an apex of the curved portion 25 protrudes relatively from the upper surface of the flap portion 22.

As shown in FIG. 11, when the cam 55 (push-up portion 55C) is further rotated counterclockwise beyond an upper dead point (position indicated by a chain line), the connecting portion 55B abuts against a supporting portion 54 to restrict and stop the rotation of the cam 55. (Although only one supporting portion 54 is illustrated in FIG. 11, the supporting portions 54 are respectively disposed on both side panels 40 to protrude inward in the width direction.)

When the cam 55 is stopped, the upper surface of the first flap 23 is located above the first nip position N1, and the upstream end 24B of the second flap 24 is positioned below the first nip position N1. Accordingly, the upper surface of the second flap 24 inclines obliquely downward toward the first nip position N1 from the upper surface of the first flap 23, and the apex of the curved portion 25 protrudes from the upper surface of the flap portion 22 (first flap 23).

By the above operation, the flap portion 22 is located at a rock-up position shown in FIG. 11, and the ejection mode is switched from the aforementioned first ejection mode to a second ejection mode which will be described later.

In addition, by rotating the cam 55 reversely, i.e., rotationally driving the cam clockwise in FIG. 11, the operation reverse to the aforementioned operation is performed in order of FIGS. 11, 10, and 9, the flap portion 22 rocks downward, and the ejection mode is switched from the second ejection mode to the first ejection mode.

<Operation at Single-Side Reading>

Figure 12:
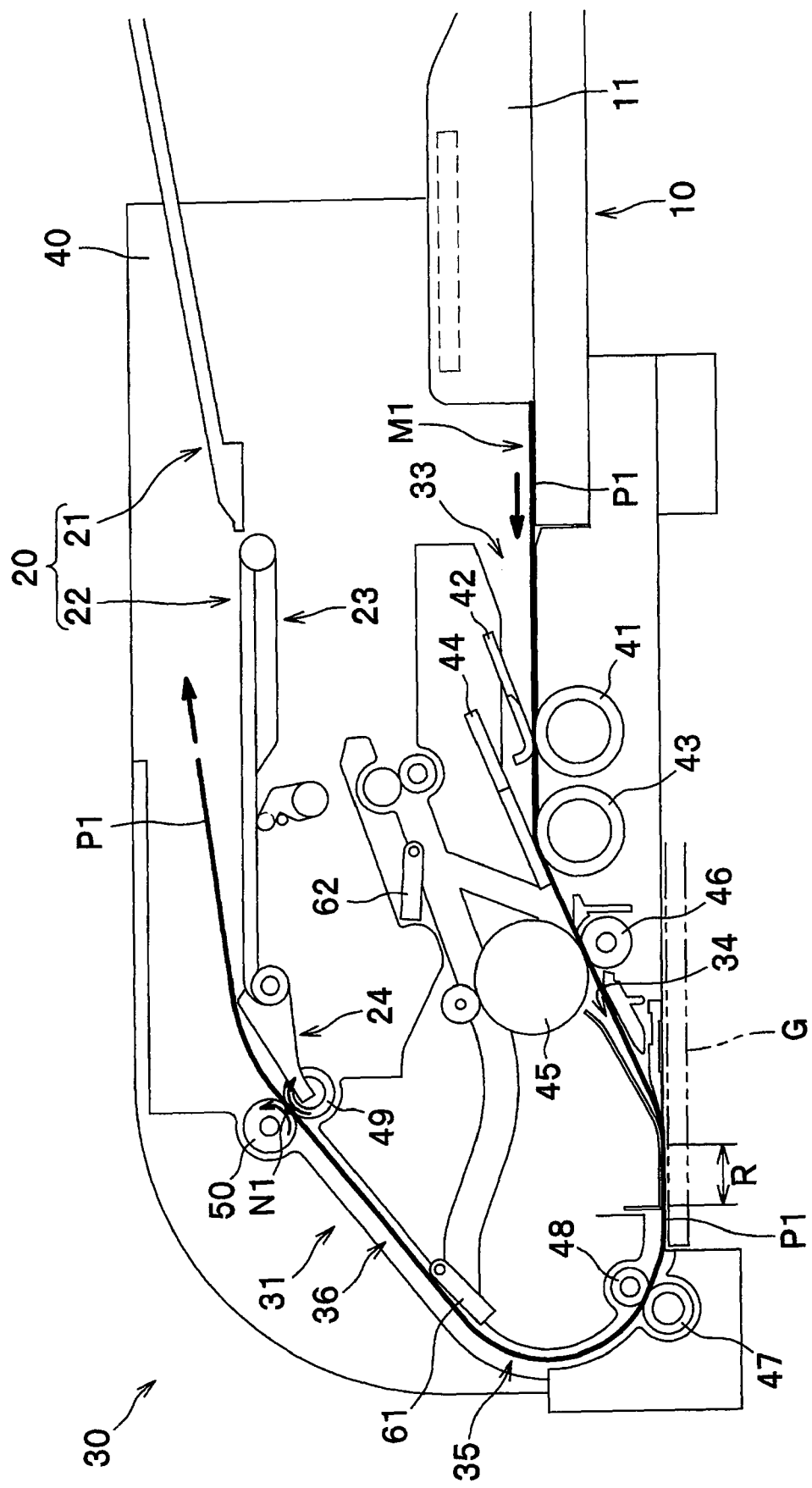
FIG. 12 is a drawing for explaining the operation at the time of single-side reading.
Figure 13:
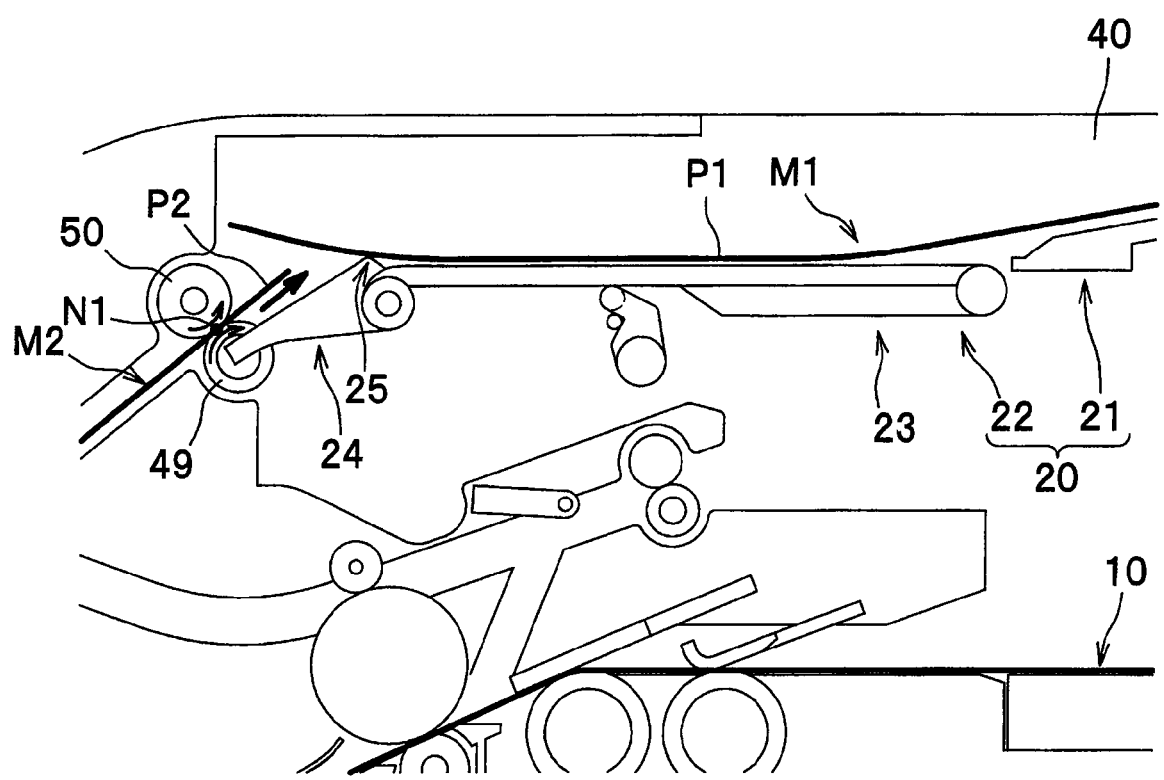
FIG. 13 is a drawing for explaining the operation in a second ejection mode.

Finally, the operation for single-side reading will be described. FIG. 12 is a drawing for explaining the operation for single-side reading, and FIG. 13 is a drawing for explaining the operation in a second ejection mode.

For single-side reading, as shown FIG. 12, the flap portion 22 is in an upwardly rocked state (that is, the flap portion 22 is located at the rock-up position). The first guide member 61 rocks downward to form part of the lower guide surface of the upper feeding path 36. In addition, the position of the second guide member 62 is arbitrary.

In this state, first, the document M1 is placed on the document placing tray 10 with the reading surface P1 turned downward.

When reading is started, the document M1 is moved to the separating roller 43 by the feed-in roller 41 and the feed-in pad 42, and is further fed to the lower feeding path 34 from the feed-in path 33 by the separating roller 43 and the separating pad 44.

The document M1 which has been fed to the lower feeding path 34 is fed to the reading position R with the reading surface P1 turned downward by the first feeding roller 45 and the pinch roller 46, and the reading surface P1 is read at the reading position R. Thereafter, the document M1 is fed to the first nip position N1 along the feeding path 31 (the curved path 35 and the upper feeding path 36) by the second feeding roller 47 and the pinch roller 48. Then, the document M1 is ejected to the document ejection tray 20 from the first nip position N1 between the sheet ejection roller 49 and the pinch roller 50, with its reading surface P1 turned upward.

As shown in FIG. 13, in a state where the flap portion 22 has rocked upward, the upper surface of the first flap 23 is located above the first nip position N1, and the upper surface of the second flap 24 inclines obliquely downward toward the first nip position N1 from the upper surface of the first flap 23. Therefore, the document M1 ejected to the document ejection tray 20 is in a state where its rear end has floated from the second flap 24.

Particularly, in this embodiment, the document M1 can be supported (floated) in the vicinity of the rear end thereof by the apex of the curved path 25 which protrudes from the upper surface of the first flap 23. Thus, the rear end can be reliably floated from the second flap 24.

Accordingly, a subsequent document M2 whose single side (reading surface P2) has been read is ejected from the first nip position between the sheet ejection roller 49 and the pinch roller 50 such that the subsequent document M2 is hidden under the previously ejected document M1.

That is, when the flap portion 22 has rocked upward, the document feeding device 1 can sequentially ejects documents in a second ejection mode where a document M1 is ejected to the document ejection tray 20 and a subsequent document M2 is ejected to be located (inserted) between the already ejected document M1 and the document ejection tray 20. Since the document M1 is ejected with the reading surface P1 turned upward and the document M2 is ejected with the reading surface P2 turned upward, the page number of the documents can be aligned in order of P1 and P2 from above. This page order is the same as the page order of the documents M1 and M2 placed on the document placing tray 10.

Figure 14:
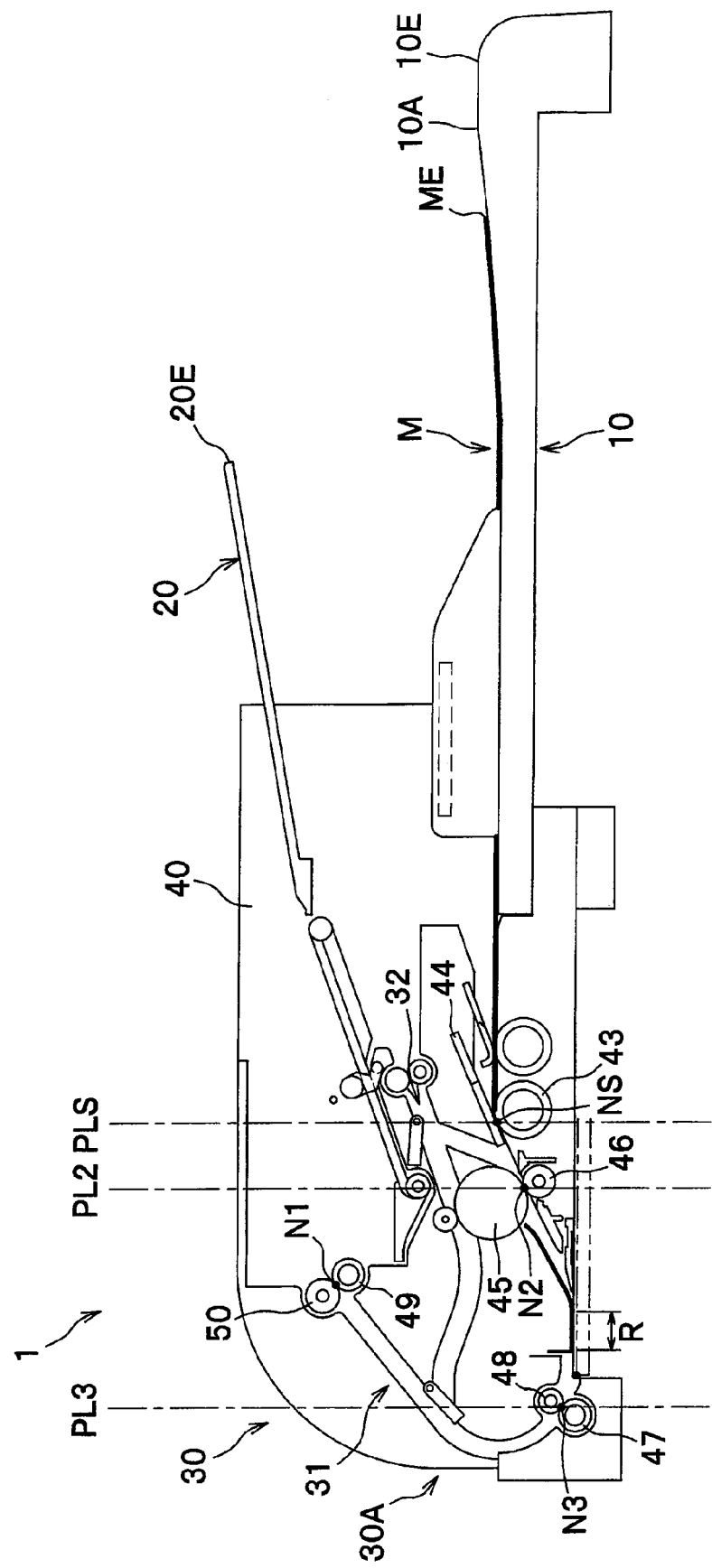
FIG. 14 is a drawing showing the positional relationship between a downstream end of a document ejection tray and an upstream end of a document placing tray.

According to the document feeding device 1, the following effects can be obtained. FIG. 14 shows the positional relationship between a downstream end of the document ejection tray 20 and an upstream end of the document placing tray 10. As shown in FIG. 14, since the first nip position N1 is arranged in the side (the left side of FIG. 14) opposite to the side where the document placing tray 10 is arranged with reference to the vertical plane PLS passing through the separation nip position NS, the whole document ejection tray 20 can be arranged so as to shift to the same side (left side of FIG. 14) as the first nip position N1.

Accordingly, the distance from the vertical plane PLS to a downstream end 20E of the document ejection tray 20 can be made smaller than the distance from the vertical plane PLS to an upstream end 10E of the document placing tray 10 (placing surface 10A). In more detail, the distance from the vertical plane PLS to the downstream end 20E can be made smaller than the distance from the vertical plane PLS to a rear end ME (upstream end) of the document M placed on the document placing tray 10.

As a result, since an upstream portion of the document placing tray 10 is exposed without being covered with the document ejection tray 20, it is possible to easily place a document on the document placing tray 10 using the exposed upstream portion. Accordingly, as compared with the configuration in which the document ejection tray is arranged to cover the upper side above the document placing tray, the operability of placing a document can be improved.

In addition, in an illustrated example shown in FIG. 14, a document having a maximum length that the document feeding device 1 can feed is used as the document M, and the document M is placed such that its tip (downstream end) is located at the separation nip position NS. Additionally, in a case where the document ejection tray 20 is retractable in the length direction (substantially right-left direction of FIG. 14) of the document M, the position of the downstream end 20E is considered based on a state where the document ejection tray 20 is most extended toward the downstream (right of FIG. 14).

According to the document feeding device 1, the first nip position N1 is arranged in the side opposite to the side where the document placing tray 10 is arranged with reference to the vertical plane PL2 passing through the second nip position N2. It is thus possible to arrange the document ejection tray 20 (downstream end 20E) so as to further shift to the same side (left side of FIG. 14) as the first nip position N1. Accordingly, since an upstream portion of the document placing tray 10 can be exposed more broadly, placement of a document onto the document placing tray 10 can be further facilitated.

The first nip position N1 is arranged in the side (right side of FIG. 14) where the document placing tray 10 is arranged with reference to the vertical plane PL3 passing through the third nip position N3. It is thus possible to make the document feeding device 1 small compared with the configuration in which the first nip position N1 is arranged on the left of FIG. 14 with respect to the vertical plane PL3.

Additionally, the first nip position N1 is arranged between the two vertical planes PL2 and PL3 such that an imaginary triangle formed by the first nip position N1, the second nip position N2 and the third nip position N3 in side view has angles, each being acute. Therefore, the feeding path 31 (curved path 35) can be formed in a smooth curved shape without increasing rollers for feeding a document. Accordingly, the number of parts can be reduced, configuration can be simplified, cost can be reduced, and jamming of a document in the feeding path 31 can be suppressed.

Since the reversing mechanism (the switchback roller 52 and the pinch roller 53) is arranged below the first nip position N1, it is not necessary to make the reversal path 32 intersect the feeding path 31. Therefore, it is unnecessary to restrict the length of a document which the document feeding device 1 can feed, and also it is possible to make the document feeding device 1 small.

Assuming that the reversing mechanism is arranged above the first nip position, it is necessary to make the reversal path (first reversal path and/or second reversal path) intersect the feeding path in order to guide a document again to the reading position which is generally located below the first nip position.

In this case, if the length of a document is greater than the length of a path from an intersection portion between the reversal path and the feeding path through the reversal path, the reading position and the feeding path to the intersection portion, the tip of the document interferes with the document itself which still exists at the intersection portion. Thus, it is necessary to restrict the length of the document which can be fed. In contrast, in a case where the reversal path 32 does not intersects the feeding path 31 like the document feeding device 1, it is unnecessary to restrict the length of the document which can be fed.

Assuming further that the reversing mechanism is arranged above the first nip position and the length of a path from the intersection portion between the reversal path and the feeding path through the reversal path, the reading position, and the feeding path to the intersection portion is sufficiently secured, the feeding path and the reversal path become long. Thus, the document feeding device will be large in size. In contrast, in the case where the reversal path 32 does not intersect the feeding path 31 like the document feeding device 1, it is possible to make the feeding path 31 and the reversal path 32 relatively shorter. Thus, it is possible to make the document feeding device 1 small in size.

Since the document ejection tray 20 has the flap portion 22 which is arranged upstream of the tray portion 21 and which can be switched to the first ejection mode and second ejection mode by upward and downward rocking, the page order of documents to be ejected can be aligned at the time of any of single-side reading and double-side reading.

The flap portion 22 is adapted to rock downward in the first ejection mode, and when the flap portion has rocked downward, the flap portion is arranged above the fourth nip position N4 (a temporary document ejection position of the reversing mechanism). Accordingly, a document can be ejected to a lower side below the flap portion 22 (document ejection tray 20) during double-side reading (during switchback) using the reversing mechanism.

As a result, a problem which may occur in a case where a document is ejected onto the document ejection tray during switchback can be solved. That is, a problem that a user may misunderstand a document temporarily ejected during switchback as having been completely read and pull out the temporarily ejected document, or a problem that, when a document is pulled back again to the document feeding unit during switchback, a document which has already been ejected onto the document ejection tray is erroneously pulled in together with the document to be switchbacked can be solved.

According to the document feeding device 1, the flap portion 22 is comprised of two parts, i.e. the first flap 23 and the second flap 24, and with the flap portion 22 rocked downward, the second flap 24 is maintained in a state where it is bent with respect to the first flap 23 and its upper surface is substantially horizontal (the second flap 24 has an inclination gentler than the upper surface of the first flap 23). Accordingly, since the moving distance of the flap portion 22 (upstream end 24B) in its height direction can be made small compared with a flap portion comprised of one part, the document feeding device 1 can be made small in the height direction.

According to the document feeding device 1, the length of a path along which a document is fed from the reversing mechanism (the fourth nip position N4) to a pair of ejection rollers (first nip position N1) is made smaller than the length of the document (for example, A4 size, letter size, etc.) as shown in FIG. 7. Accordingly, since the document feeding unit 30 can be made small, the document feeding device 1 can be made small.

According to the document feeding device 1, since a document is fed to the reading position R in a direction from the middle of the platen glass G toward the end thereof (in a direction from right to left in FIG. 3), the platen glass G of the document reading device (reading glass) can be comprised of one platen glass, and the document feeding device 1 can be made small in the horizontal direction.

Assuming that a document is fed in an opposite direction (in a direction from left to right in FIG. 3) in the configuration shown in FIG. 3, the document will enter between the platen glass G and the document feeding device 1, and the document cannot be fed to the document ejection tray (document placing tray 10 in FIG. 3) which is arranged at the upper right of the reading position.

Therefore, generally, when a document is fed in a direction opposite to that of the document feeding device 1 in the configuration shown in FIG. 3, a platen glass is split at the right side of the reading position R so that one piece of the platen glass is for the reading position and the other piece of the platen glass is for a reading surface of, for example, a flatbed scanner. Further, a guide member for guiding the document is disposed between the two pieces of the platen glass. The guide member has a lower end lower in height than the upper surface of the one piece of the platen glass, and also has an inclined surface which inclines obliquely upward to the right from the lower end. With this arrangement, a document can be fed to the document ejection tray, arranged on the upper right, without entering between the other piece of the platen glass and the document feeding device. However, since the other pieces of the platen glass is in general used as the reading surface of the flatbed scanner, its length (or width) needs to be the same as at least the length (or width) of a document of a largest size to be placed.

In contrast, in a case where a document is fed to the reading position R in a direction from the middle of the platen glass G toward the end thereof like the document feeding device 1, the platen glass can be comprised of one platen glass G having the same length (or width) as the other piece of the platen glass. Thus, it is possible to make horizontal dimensions small by a length corresponding to the sum of the one piece of the platen glass and a region where the guide member is disposed. Accordingly, the document feeding device 1 can be made small in the horizontal direction.

Although the embodiment of the invention has been described above, the invention is not limited to the aforementioned embodiment. Specific configurations can be properly altered without departing from the sprit or scope of the invention.

Although the aforementioned embodiment has shown the example in which the separating roller 43 and the separating pad 44 are adopted as an example of a separating mechanism, the separating mechanism of the invention is not limited thereto, and for example, a pair of rollers (separating rollers) may be adopted.

Although the aforementioned embodiment has shown the example in which the downstream end 20E of the document ejection tray 20 is located nearer the reading position R than the rear end ME of the document M placed on the document placing tray 10 such that its tip is located at the separation nip position NS, the invention is not limited thereto. For example, if the length of the document placing tray is smaller than the length of a document placed on the document placing tray such that its tip is located at the separation position, it suffices that the downstream end of the document ejection tray is nearer the reading position than the upstream end of the document placing tray (the downstream end of the document ejection tray is located between the reading position and the upstream end of the document placing tray).

Although the aforementioned embodiment has shown the configuration in which the document guides 11 and 12 are provided with the document supporting portions 11A and 12A, the invention is not limited thereto. For example, both of the side panels 40 or the document ejection tray may be provided with a document supporting portion(s). That is, the document supporting portions may be flat-plate-shaped document supporting portions extending inward from both the side panels 40 in the width direction, or may be a pair of document supporting portions, each having a substantial L-shape in front view and extending downward from the lower surface of the document ejection tray and further extending inward in the width direction to face each other in the width direction. Alternatively, the document placing tray may be formed in a tubular shape and an upper surface of an upper wall of the tubular document placing tray may be used as a document supporting portion. In addition, the document feeding device according to the invention may have a configuration with no document guides.

Although the aforementioned embodiment has shown the configuration in which the surface (lower surface 23D of the first flap 23) of the flap portion 22 facing the document placing tray 10 is provided with the plurality of ribs 23E, the invention is not limited thereto. For example, such ribs may be provided on the surface of the document supporting portion which supports a document. In addition, since such ribs are not essential components in the invention, they can be omitted.

Although the aforementioned embodiment has shown the example in which the flap portion 22 is comprised of two parts of the first flap 23 and the second flap 24, the invention may not be limited thereto. For example, the flap portion may be comprised of one part (one flap), and may be comprised of three or more parts (three or more flaps).

Although the aforementioned embodiment has shown the example in which the length of a path along which a document is fed from the reversing mechanism (the fourth nip position N4) to a pair of ejection rollers (first nip position N1) is made smaller than the length of the document, the invention is not limited thereto. That is, the length of a path along which a document is fed from the reversing mechanism to the pair of ejection rollers may be the same as the length of the document, and may be made greater than the length of the document.

The configuration of the feeding mechanism shown in the aforementioned embodiment is an example, and the invention is not limited thereto. For example, the number or arrangement of the respective rollers can be changed properly. Additionally, a roller can also be adopted instead of the pad. That is, as for the feeding mechanism and the reversing mechanism, their configurations or members to be adopted may be properly changed without departing the spirit or scope of the invention.

The configuration of the feeding path 31 and the reversal path 32 (the first reversal path 32A and the second reversal path 32B) which are shown in the aforementioned embodiment is an example, and the invention is not limited thereto. That is, the configuration of the feeding path and the reversal path can be properly changed depending on the positional relationship between the document placing tray and the document ejection tray (flap portion) or the shape, size, etc. of the document feeding unit.

Although the aforementioned embodiment has shown the example in which the invention is applied to the document feeding device 1 which allows double-side reading of a document, the invention is not limited thereto. For example, the invention may be applied to a document feeding device which executes only single-side reading of a document.

What is claimed is:

1. A document feeding device comprising:
    a document placing tray;
    a document ejection tray disposed above the document placing tray;
    a feeding path extending from the document placing tray through a reading position to the document ejection tray;
    a separating mechanism configured to separate, at a separation position, a document from documents stacked on the document placing tray to feed the separated document toward the reading position along the feeding path; and
    ejection rollers which nip, at a first nip position, the document fed through the reading position along the feeding path and eject the nipped document to the document ejection tray;
    a first reversal path which branches from the feeding path at a position downstream of the reading position, which is configured to guide the document fed through the reading position to the outside;
    a second reversal path which branches from the first reversal path, which is connected to the feeding path at a position upstream of the reading position and which is configured to guide the fed document from the first reversal path to the reading position; and
    a reversing mechanism which is arranged below the first nip position, and which is configured to temporarily eject part of the fed document from the first reversal path to the outside, and feed the fed document from the first reversal path to the second reversal path,
    wherein the document ejection tray has a flap portion which is arranged near the ejection rollers, and which is configured to rock down to provide a first mode and rock up to provide a second mode,
    wherein in the first mode a first document ejected from the ejection rollers is placed on the document ejection tray and a second document ejected from the ejection rollers subsequently from the first document is stacked on the first document,
    wherein in the second mode a third document ejected from the ejection rollers is placed on the document ejection tray and a fourth document ejected from the ejection rollers subsequently from the third document is inserted between the third document and the document ejection tray, and
    wherein the flap portion in the first mode is located above a temporary document ejection position at which the reversing mechanism temporarily ejects part of a document from the first reversal path to the outside, wherein the first nip position of the ejection rollers is arranged in a side opposite to a side where the document placing tray is arranged with reference to a vertical plane passing through the separation position of the separating mechanism, and wherein the document ejection tray overlaps the document placing tray in a vertical plane parallel to the vertical plane passing through the separation position of the separating mechanism.

2. The document feeding device according to claim 1, further comprising:

upstream feeding rollers arranged between the separation position and the reading position in the feeding path, and configured to nip and feed, at a second nip position, the separated document to the reading position, wherein the first nip position is arranged in a side opposite to a side where the document placing tray is arranged with reference to a vertical plane passing through the second nip position of the upstream feeding rollers.

3. The document feeding device according to claim 1, further comprising:

downstream feeding rollers arranged between the first nip position and the reading position in the feeding path and configured to nip and feed, at a third nip position, the document fed through the reading position toward the ejection rollers;

wherein the first nip position is arranged in a side where the document placing tray is arranged with reference to a vertical plane passing through the third nip position of the downstream feeding rollers.

4. The document feeding device according to claim 1, wherein a distance between the vertical plane passing through the separation position of the separating mechanism and a downstream end of the document ejection tray is smaller than a distance between the vertical plane passing through the separation position of the separating mechanism and an upstream end of the document placing tray.

5. The document feeding device according to claim 1, wherein the reading position is arranged on a side opposite to a side where the document placing tray and the document ejection tray are arranged with reference to a vertical plane passing through the reading position and parallel to the vertical plane passing through the separation position of the separating mechanism.

6. The document feeding device according to claim 1, further comprising feeding rollers to feed the document along the feeding path from the separation position through the reading position to the first nip position.

7. A document feeding device comprising:
a document placing tray;
a document ejection tray disposed above the document placing tray;
a feeding path extending from the document placing tray through a reading position to the document ejection tray;
a separating mechanism configured to separate, at a separation position, a document from documents stacked on the document placing tray to feed the separated document toward the reading position along the feeding path;
ejection rollers which nip, at a first nip position, the document fed through the reading position along the feeding path and eject the nipped document to the document ejection tray;
a first reversal path which branches from the feeding path at a position downstream of the reading position, which is configured to guide the document fed through the reading position to the outside;
a second reversal path which branches from the first reversal path, which is connected to the feeding path at a position upstream of the reading position and which is configured to guide the fed document from the first reversal path to the reading position; and
a reversing mechanism which is arranged below the first nip position, and which is configured to temporarily eject part of the fed document from the first reversal path to the outside, and feed the fed document from the first reversal path to the second reversal path,
wherein the document ejection tray has a flap portion which is arranged near the ejection rollers, and which is configured to rock down to provide a first mode and rock up to provide a second mode,
wherein in the first mode a first document ejected from the ejection rollers is placed on the document ejection tray and a second document ejected from the ejection rollers subsequently from the first document is stacked on the first document,
wherein in the second mode a third document ejected from the ejection rollers is placed on the document ejection tray and a fourth document ejected from the ejection rollers subsequently from the third document is inserted between the third document and the document ejection tray,
wherein the flap portion in the first mode is located above a temporary document ejection position at which the reversing mechanism temporarily ejects part of a document from the first reversal path to the outside,
wherein the first nip position of the ejection rollers is arranged in a side opposite to a side where the document placing tray is arranged with reference to a vertical plane passing through the separation position of the separating mechanism, and
wherein the reading position is arranged on a side opposite to a side where the document placing tray and the document ejection tray are arranged with reference to a vertical plane passing through the reading position and parallel to the vertical plane passing through the separation position of the separating mechanism.

* * * * *